R. J. A. FARRINGTON.
COCKTAIL MIXER.
APPLICATION FILED JULY 25, 1916.
1,211,426. Patented Jan. 9, 1917.
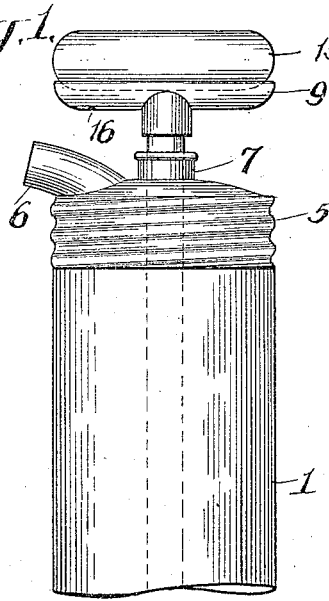
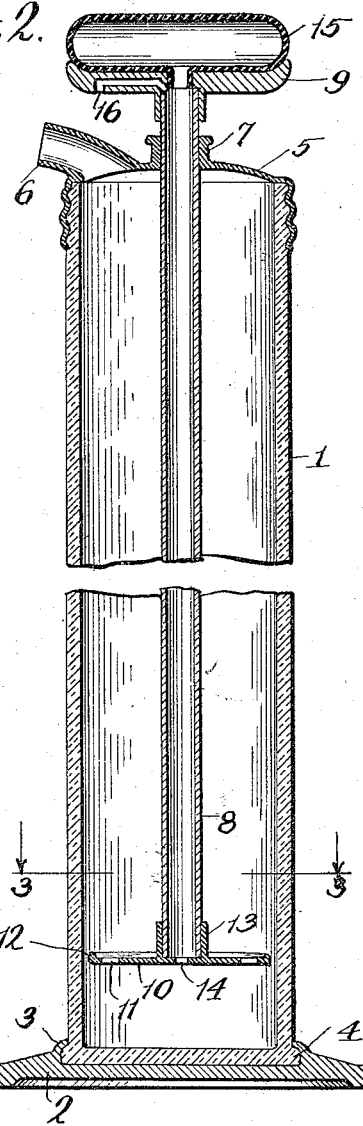
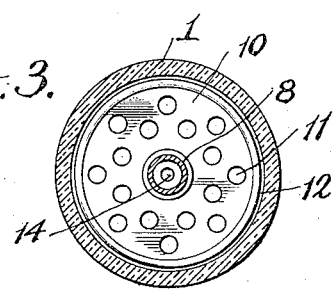
INVENTOR.
Richard J. A. Farrington
BY
ATTORNEYS.

UNITED STATES PATENT OFFICE.

RICHARD J. ANDERSON FARRINGTON, OF NEW YORK, N. Y.

COCKTAIL-MIXER.

1,211,426. Specification of Letters Patent. Patented Jan. 9, 1917.

Application filed July 25, 1916. Serial No. 111,153.

*To all whom it may concern:*

Be it known that I, RICHARD J. ANDERSON FARRINGTON, a subject of the King of Great Britain, residing in the borough of Manhattan, city, county, and State of New York, have invented certain new and useful Improvements in Cocktail-Mixers, of which the following is a specification.

My invention relates to a cocktail mixer and my object is to produce an improved device which is particularly well adapted for efficiently and thoroughly mixing cocktails or the like.

I preferably provide a glass casing mounted on a substantial base, the casing being provided with a screw-cap through which extends a reciprocable operating rod, the latter having a perforated disk at its lower end operating within the cylinder. The cover or cap is provided with a spout from which the mixture may be poured. By means of the perforated disk within the cylinder, the mixed liquids may be perfectly blended when desired and immediately poured without the necessity of removing the cap.

My invention also preferably includes means for aerating the mixture during the blending or agitation of the same.

In order that my invention may be more clearly understood, attention is hereby directed to the accompanying drawings illustrating one embodiment of my invention.

In the drawings Figure 1 represents a side elevation of my improved device, Fig. 2 is a longitudinal section through the same and Fig. 3 is a horizontal section on line 3—3 of Fig. 2.

Referring to the drawings the device comprises a cylindrical casing 1 which is preferably formed of glass. This is closed at the bottom and is mounted on a base plate 2 which is adapted to hold the device firmly on a table or other supporting surface both while being operated and while standing. The cylindrical casing may be secured to the base 2 in any suitable manner, as by forming the base with an inwardly extending flange 3 formed about a peripheral flange 4 at the base of the casing 1. The upper end of the casing is closed by a removable cover, preferably in the form of a screw-cap 5, which is adapted to be screwed onto the upper end of the casing which may be suitably threaded to receive the same. The screw-cap is provided with a spout 6 through which the blended mixture may be poured. The cap is also provided with a neck portion 7 adapted to form a bearing through which extends the operating rod 8. Rod 8 is provided at its upper end with a handle 9 and at its lower end the perforated disk 10 is secured in any suitable manner. Disk 10 is of slightly less diameter than the inner diameter of the casing 1 and is provided with perforations 11 of comparatively small area and extending over the greater part of the surface of the disk. The disk may conveniently be formed of a metal stamping having a stiffening bead 12 about its periphery and an upwardly extending sleeve portion 13 in which the lower end of rod 8 may be secured.

My invention also preferably includes means for aerating the mixture during the operation of the plunger. As shown in the drawings, the operating rod 8 may be hollow or may have a longitudinal opening therethrough, the disk 10 having a small central opening 14 therethrough in alinement with the passage through the operating rod. A rubber bulb 15 may be mounted above the handle 9 and suitably connected with the upper end of the passage through rod 8 as shown. A small air hole 16 is also formed in the bottom of handle 9 or upper part of the rod 8 a short distance below handle 9, this opening 16 communicating with the longitudinal passageway extending through rod 8.

To use the device, the cap 5 is removed and the desired ingredients poured into the casing 1, together with finely crushed ice if desired. The cap 5 is then mounted in position with the perforated disk 10 extending into the mixture. A few rapid reciprocations of the operating rod will suffice to thoroughly blend the mixture, the latter being forced through the perforations in disk 10 as the latter travels both up and down. The finished product may then be poured from the spout 6 without removing the cover.

The apparatus is made sufficiently long to enable a desired amount of mixture to be contained therein without the danger of the same splashing through the spout 6 when the mixture is being agitated.

When the aerating device is additionally used as described, the operator manipulates bulb 15 at the same time that he reciprocates the handle. The handle may be grasped with one hand and bulb 15 actuated with the same hand, the bulb being pressed flat against the handle as the latter is forced down while opening 16 is held closed with the finger of the hand. On the up-stroke the finger is removed from opening 16 and the bulb is released. This action results in forcing the air contained in the bulb into the mixture during the down-stroke of the plunger, atmospheric air passing through opening 16 to again inflate the bulb during the up-stroke of the plunger.

The result of operating the device, with or without the use of the aerating feature, is to form a creamy composition of a character not possible with the cocktail shakers formerly employed. The additional use of the aerating device serves not only to thoroughly aerate the composition and give it a peculiarly pleasing quality, but also to aid the perforated disk 10 in thoroughly blending the mixture.

Having now particularly described my invention, what I claim and desire to protect by Letters Patent is as follows:—

1. In a cocktail mixer, the combination of an elongated cylindrical casing, a base member secured thereto, a removable cover member on the open upper end of the casing, having a central opening therethrough and a pouring spout at one side thereof, and a reciprocable operating rod extending through said opening, having a perforated disk at its lower end, extending substantially across the interior of the casing, substantially as set forth.

2. In a cocktail mixer, the combination of an elongated cylindrical casing, having a flat base and an open upper end, a screw-cap removably mounted on the upper end, having a central opening therethrough and a pouring spout at one side thereof, an operating rod extending through said opening and reciprocally mounted therein, said rod having a handle member at its upper end, and a perforated mixing disk on the lower end of the rod, substantially as set forth.

3. In a cocktail mixer, the combination of a cylindrical casing, having an open upper end, a removable cover member thereon, having a central opening therethrough, an operating rod extending through and mounted to reciprocate therein, said rod having a longitudinal passage therethrough and a vent connecting said passage with the atmosphere, adjacent the upper end of the rod, a perforated mixing device on the lower end of the rod, a handle on the upper end of the rod and an elastic bulb adjacent the handle and connected with the upper end of said passage, substantially as set forth.

This specification signed and witnessed this 8th day of July, 1916.

RICHARD J. ANDERSON FARRINGTON.

Witnesses:
DYER SMITH,
G. M. WILLIAMSON.

Copies of this patent may be obtained for five cents each, by addressing the "Commissioner of Patents, Washington, D. C."